United States Patent
Hendrix et al.

(10) Patent No.: US 10,930,996 B2
(45) Date of Patent: *Feb. 23, 2021

(54) INTEGRATED CELL SITE SECTOR

(71) Applicant: CommScope Technologies LLC, Hickory, NC (US)

(72) Inventors: Walter Mark Hendrix, Richardson, TX (US); Michael Paulus, Dallas, TX (US); Julian R. Colapietro, McKinney, TX (US); William Howard Burnett, Jr., Plano, TX (US); James P. McCabe, Sachse, TX (US)

(73) Assignee: CommScope Technologies LLC, Hickory, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/284,460

(22) Filed: Feb. 25, 2019

(65) Prior Publication Data

US 2019/0190116 A1 Jun. 20, 2019

Related U.S. Application Data

(63) Continuation of application No. 15/648,842, filed on Jul. 13, 2017, now Pat. No. 10,218,046.

(Continued)

(51) Int. Cl.
*H01Q 1/12* (2006.01)
*H04Q 1/06* (2006.01)
(Continued)

(52) U.S. Cl.
CPC .......... *H01Q 1/1228* (2013.01); *H01Q 1/246* (2013.01); *H04Q 1/06* (2013.01); *H04Q 1/08* (2013.01);
(Continued)

(58) Field of Classification Search
CPC .................................................. H01Q 1/1228
See application file for complete search history.

(56) References Cited

U.S. PATENT DOCUMENTS 6,816,706 B1 * 11/2004 Hohnstein ............... H01Q 1/06
455/16
6,996,419 B1 * 2/2006 Rausch .................. H04B 1/525
333/1.1

(Continued)

FOREIGN PATENT DOCUMENTS

WO WO2015072727 5/2015
WO WO2015095779 6/2015

OTHER PUBLICATIONS

International Search Report and Written Opinion corresponding to PCT Patent Application No. PCT/US17/041821 (11 pages) (dated Oct. 12, 2017).

*Primary Examiner* — Wen W Huang
(74) *Attorney, Agent, or Firm* — Myers Bigel, P.A.

(57) ABSTRACT

A cell site sector includes: a mounting frame; an RF antenna mounted to one side of the mounting frame; and at least one (RRU mounted to a second, opposed side of the mounting frame and operationally connected with the antenna. The RRU and the RF antenna have horizontal width and depth dimensions, the width dimension being greater than the depth dimension, wherein the width dimension of the RRU is generally parallel with the width dimension of the RF antenna.

20 Claims, 14 Drawing Sheets

Related U.S. Application Data

(60) Provisional application No. 62/366,395, filed on Jul. 25, 2016.

(51) Int. Cl.
    *H04Q 1/08*       (2006.01)
    *H01Q 1/24*       (2006.01)
    *H04Q 1/02*       (2006.01)
    *H01Q 1/42*       (2006.01)
    *H01Q 1/44*       (2006.01)
    *H04W 88/08*     (2009.01)

(52) U.S. Cl.
    CPC ............... *H04Q 1/09* (2013.01); *H04Q 1/118* (2013.01); *H04Q 1/15* (2013.01); *H01Q 1/42* (2013.01); *H01Q 1/44* (2013.01); *H04W 88/085* (2013.01)

(56) References Cited

U.S. PATENT DOCUMENTS

| | | |
|---|---|---|
| 9,209,523 B2 | 12/2015 | Ma et al. |
| 9,281,866 B2 | 3/2016 | Smentek et al. |
| 9,287,613 B2 | 3/2016 | Colapietro et al. |
| 9,888,391 B2 | 2/2018 | Ho et al. |
| 2014/0315408 A1* | 10/2014 | Colapietro ............. H01R 13/46 439/247 |
| 2015/0057047 A1* | 2/2015 | Hendrix ................... H01Q 1/02 455/562.1 |
| 2015/0091777 A1 | 4/2015 | Rucki et al. |
| 2016/0302078 A1* | 10/2016 | Sivanandar ............ H01Q 1/246 |
| 2016/0336641 A1* | 11/2016 | DiPiero ................ H01Q 1/1228 |

\* cited by examiner

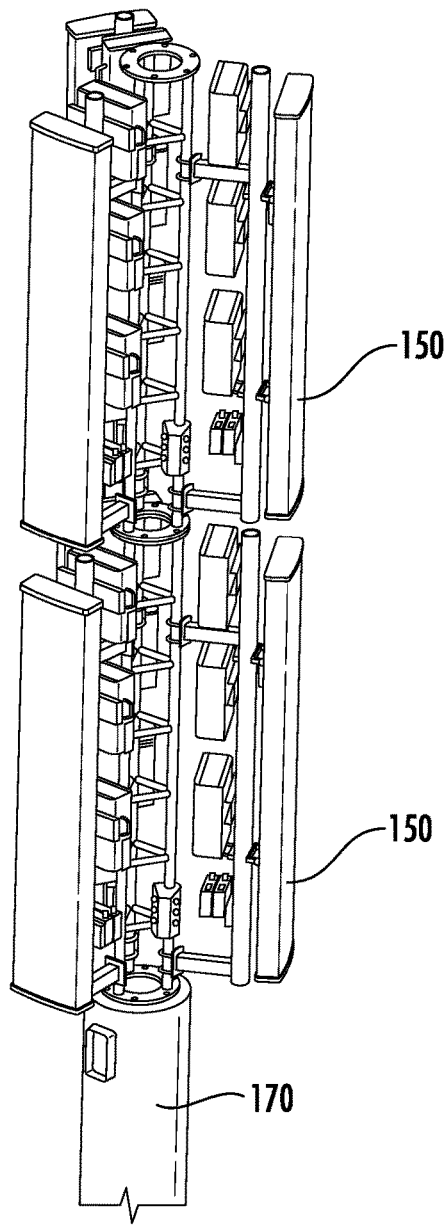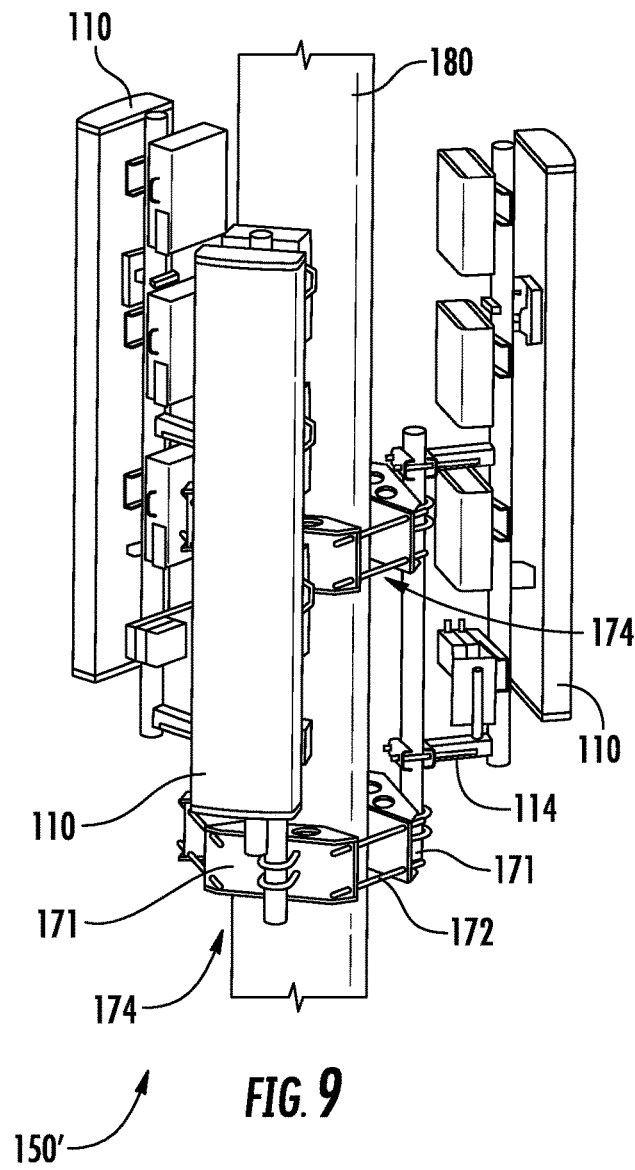
FIG. 8
FIG. 9

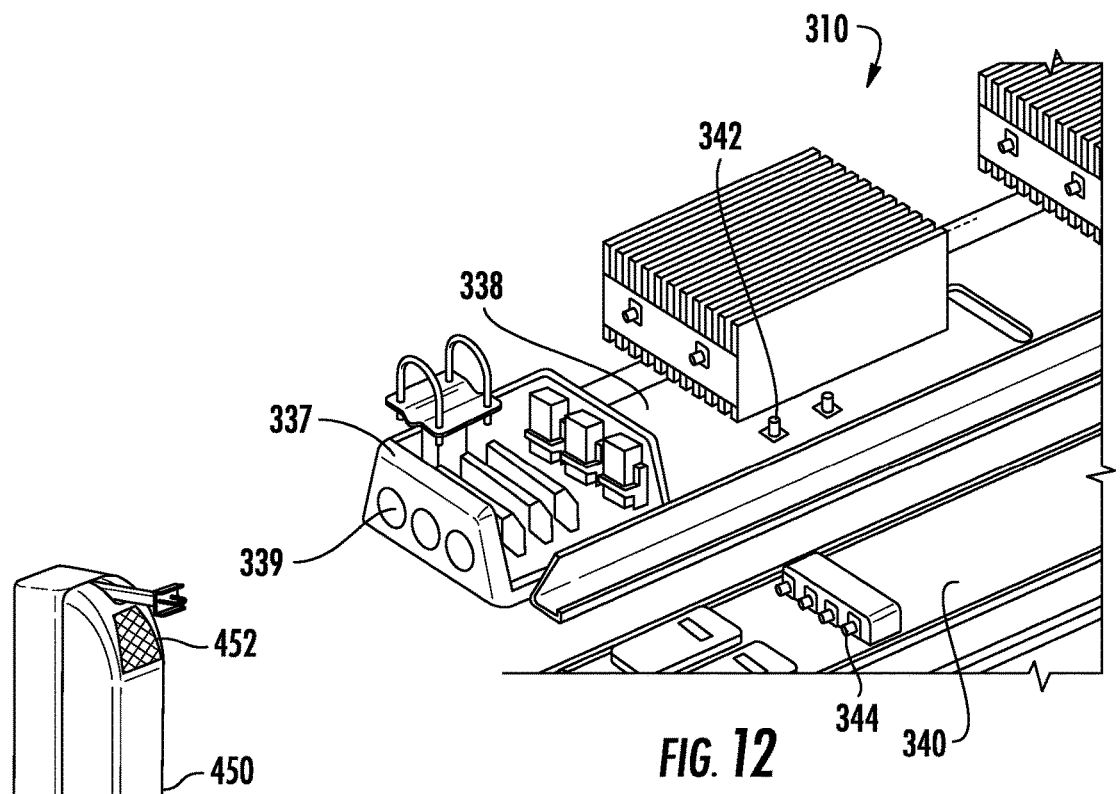
FIG. 12
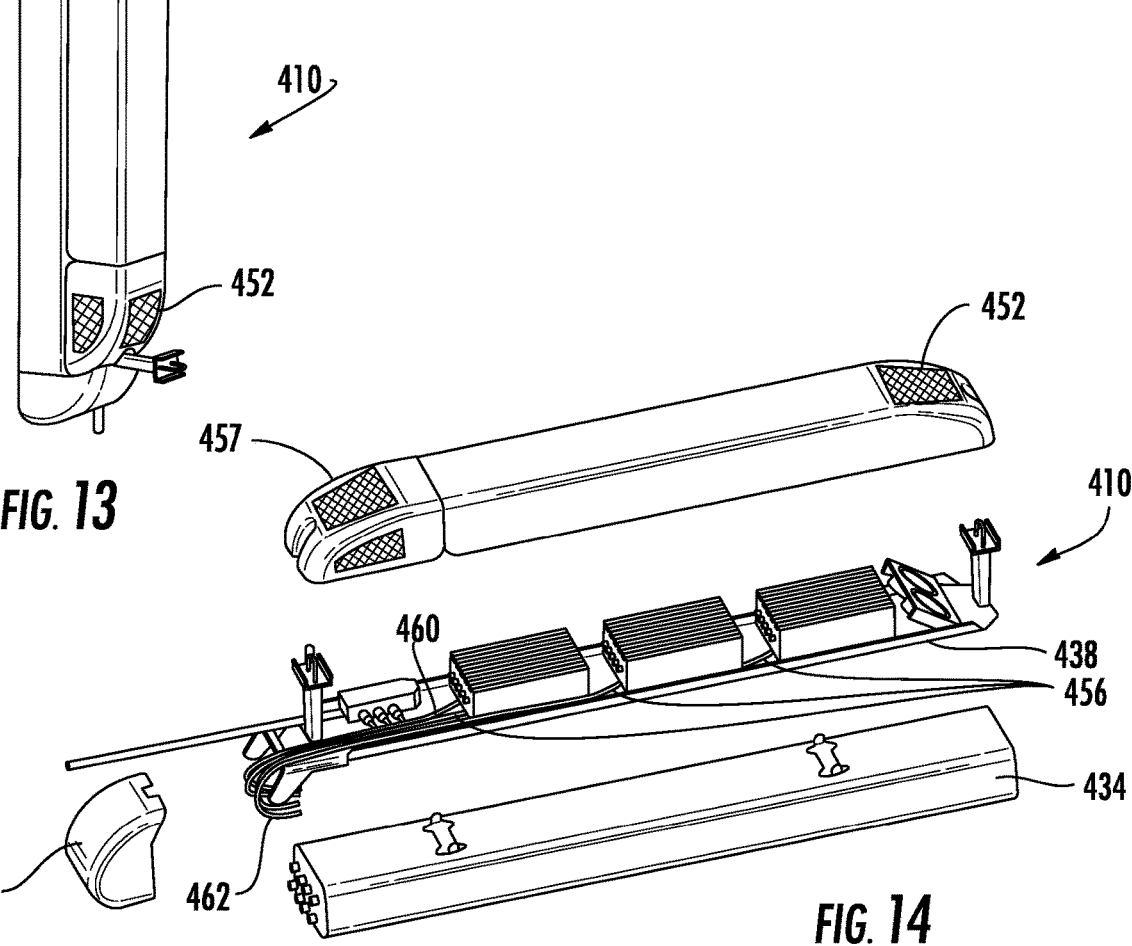
FIG. 13
FIG. 14

INTEGRATED CELL SITE SECTOR

RELATED APPLICATION

The present application is a continuation of and claims priority to U.S. patent application Ser. No. 15/648,842, filed Jul. 13, 2017, now U.S. Pat. No. 10,218,046, which claims priority from and the benefit of U.S. Provisional Patent Application No. 62/366,395, filed Jul. 25, 2016, the disclosure of which is hereby incorporated herein in its entirety.

FIELD OF THE INVENTION present inventions relate generally to wireless communications. In particular, they relate to improvements in wireless base station antenna and radio deployments.

BACKGROUND

One known wireless radio network system that may be mounted at the top of the tower comprises a remote radio unit (RRU) and a separate antenna. These components are mounted in separate locations and are then cabled together using jumper cables to pass the radio frequency (RF) signal between them. Such an installation, when done on site, may involve complex and time consuming installations, and may introduce opportunities for installation errors. For example, current installations typically require multiple jumper cables and multiple mounting kits/hardware. This involves substantial installation time (approximately 12-15 hours per site). In addition, doing this installation at the site outdoors in variable temperature and humidity conditions can adversely affect interconnect quality and overall system performance.

Typically, it is up to the installation team to determine a mounting method. For example, once the antenna and RRU are mounted at the tower top, it is up to the installer to cable and connect the components together correctly. The installer will need a schematic or wiring diagram to understand how such connections should be made. This introduces the possibility of installing cables at the wrong locations, installing cables of incorrect lengths, improperly assembling connectors to the jumper cables, not engaging them correctly, or other installation errors.

One approach involves the use of a pre-assembled cell site sector. This approach, illustrated in FIG. 1 and described in detail in WO 2015/095779 (incorporated herein by reference in its entirety), employs two parallel vertical members 12, 14 that are spanned by RRU mounting sites 16 on which RRUs 32 are mounted. The vertical member 12 provides a site for mounting of an antenna 34, and the other vertical member 14 can be mounted to the leg of an antenna tower or the like. The ability to assemble the entire site remotely, confirm that the connections have been made correctly and test their performance, then mount it in place on an antenna tower, can provide significant time savings for installation.

SUMMARY

As a first aspect, embodiments of the invention are directed to a cell site sector. The cell site sector comprises: a mounting frame; an RF antenna mounted to one side of the mounting frame; and at least one (RRU mounted to a second, opposed side of the mounting frame and operationally connected with the antenna. The RRU and the RF antenna have horizontal width and depth dimensions, the width dimension being greater than the depth dimension, wherein the width dimension of the RRU is generally parallel with the width dimension of the RF antenna.

In some embodiments, three cell site sectors are mounted to a tri-sector frame having three vertical mounting members, wherein each of the cell site sectors is mounted to a respective one of the vertical mounting members.

In other embodiments, the mounting frame comprises a backplane. The backplane may include connectors configured to connect with the RRU. A fiber/power distribution unit mounted to the second side of the backplane. In some embodiments, the RRU includes connectors, and the RRU connectors are blind-mated to connectors mounted on the backplane.

In additional embodiments, the mounting frame further comprises a subfloor attached to the backplane, wherein the antenna is mounted to the subfloor and the RRU is mounted to the backplane. Other components, such as a battery, an RF conditioning unit, a fiber/power distribution unit (including at least one of a voltage regulator, a power redundancy circuit, and an overvoltage protection unit) may be mounted on the backplane.

The mounting frame may also include baffling to promote cooling.

BRIEF DESCRIPTION OF THE FIGURES

FIG. 8 is a perspective view of two tri-sector frames and cell site sectors mounted on the top of a pole.

FIG. 9 is a perspective view of three cell site sectors of FIG. 4 mounted to a monopole with mounting brackets.

FIG. 12 is an enlarged exploded perspective view of one end of the cell site sector of FIG. 11.

FIG. 13 is a perspective view of a backplane-based cell site sector covered by a cover panel according to further embodiments of the invention.

FIG. 14 is an exploded perspective view of the cell site sector and cover panel of FIG. 13.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., an assembly, a housing, a cable, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
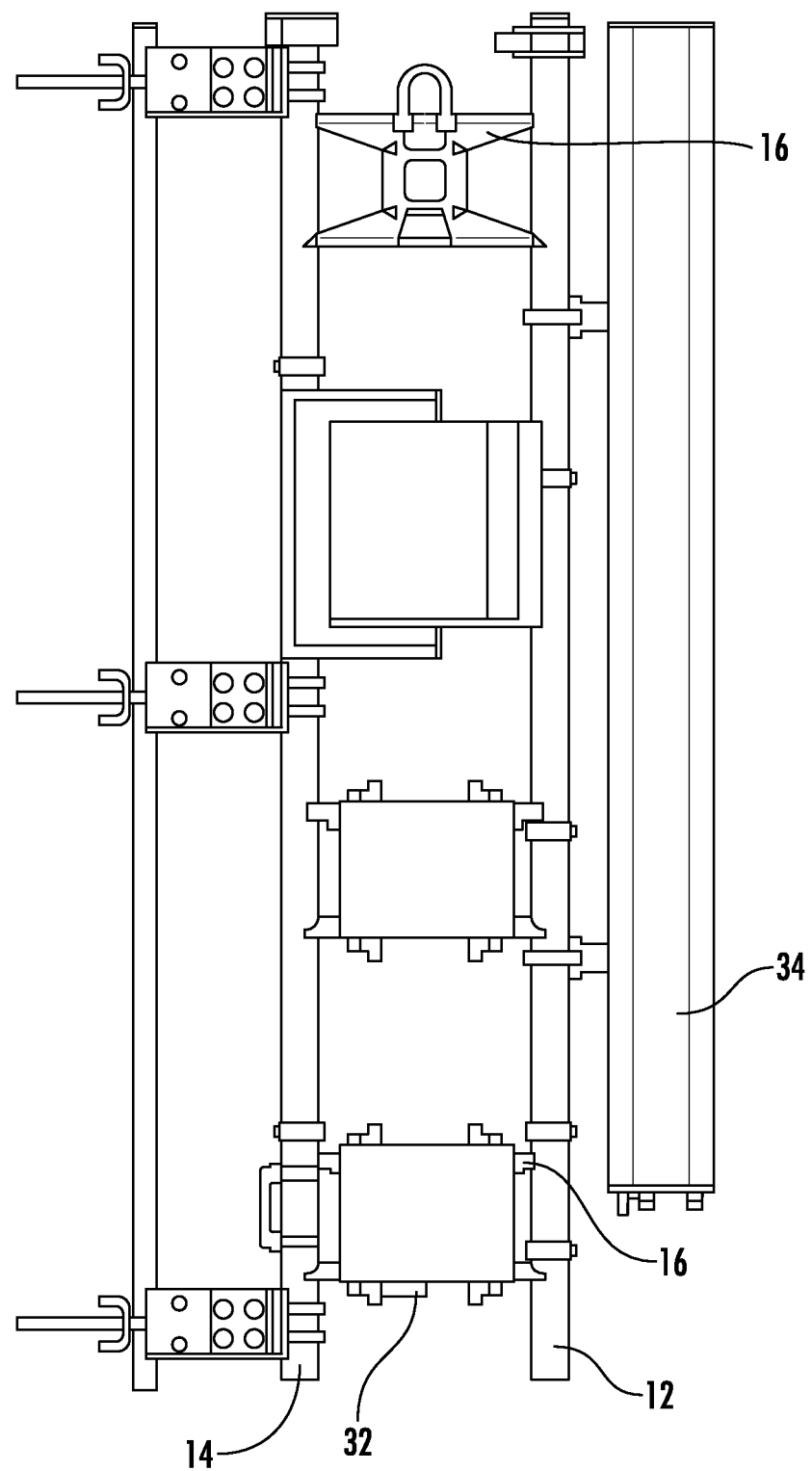
FIG. 1 is a side view of a prior pre-assembled cell site sector.
Figure 2:
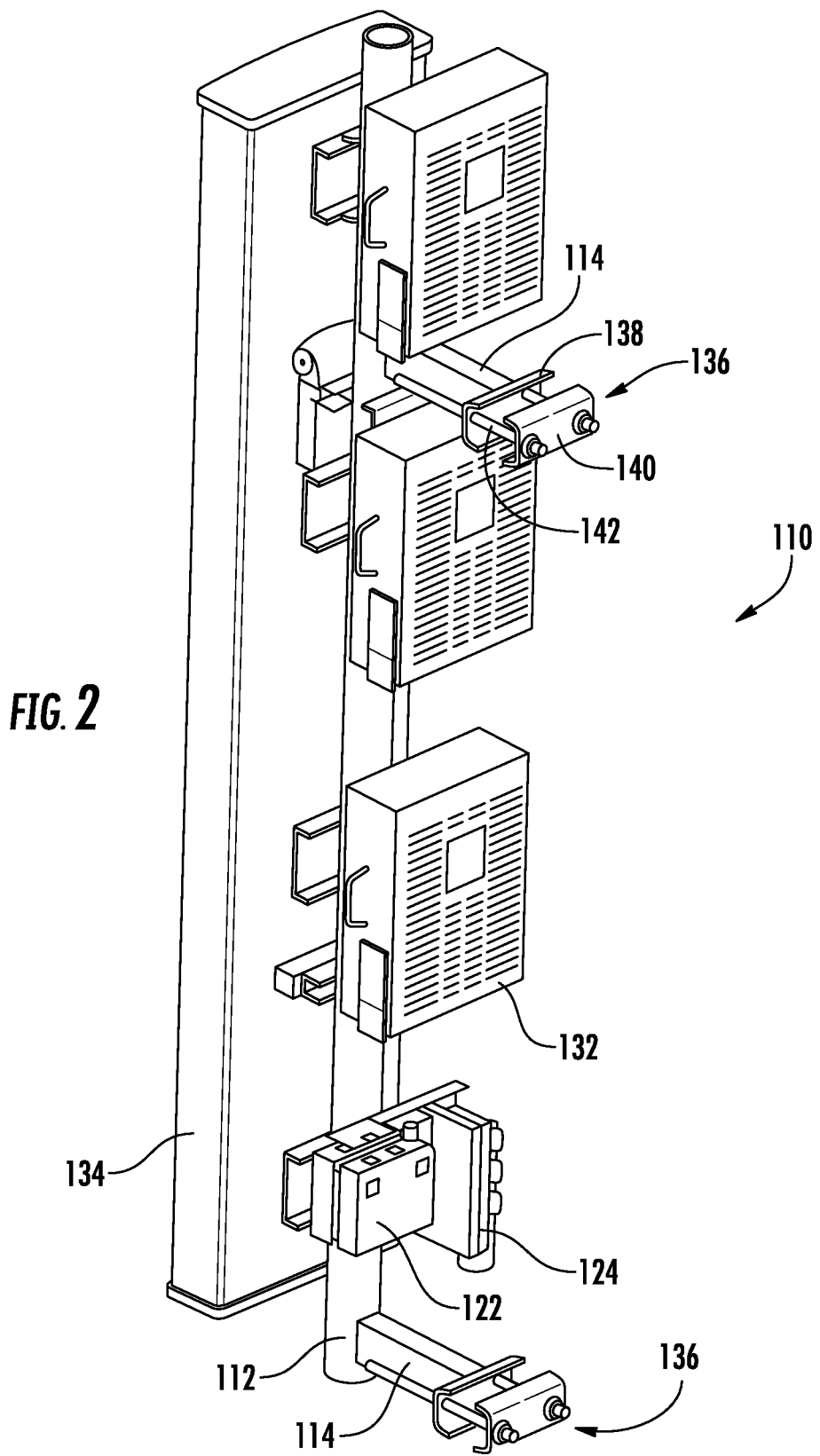
FIG. 2 is a perspective view of a pre-assembled cell site sector according to embodiments of the invention.
Figure 3:
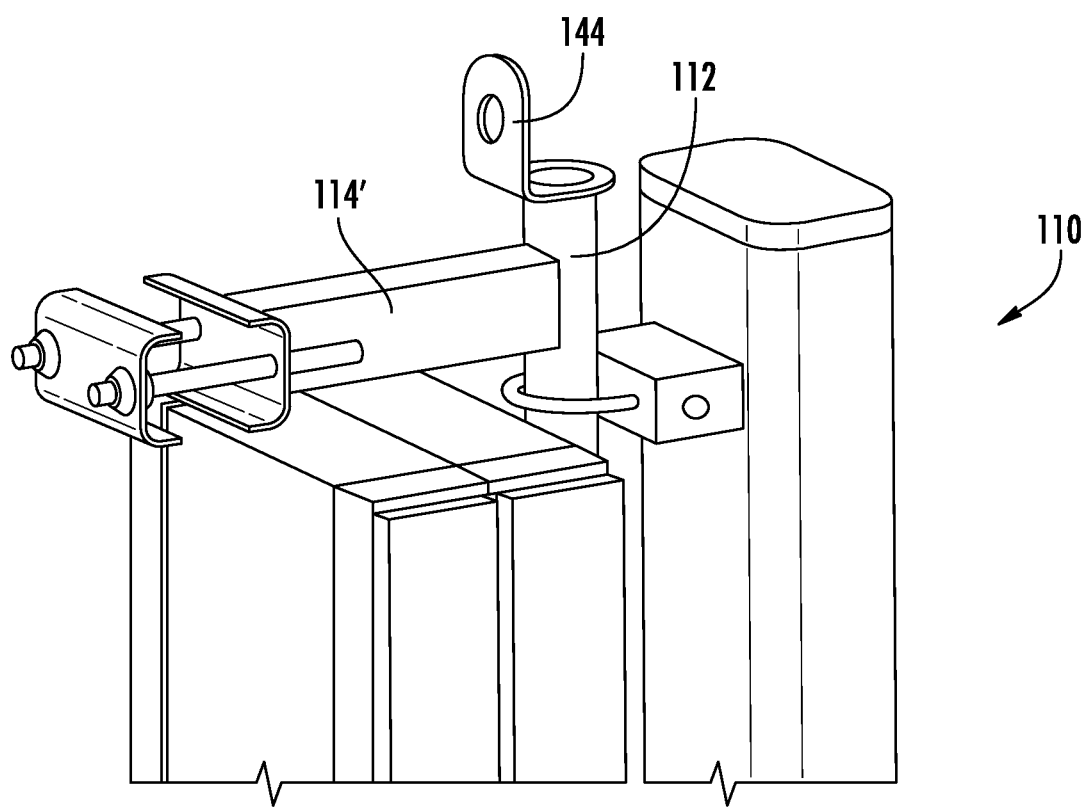
FIG. 3 is an enlarged perspective view of the top portion of the cell site sector of FIG. 2.
Figure 4:
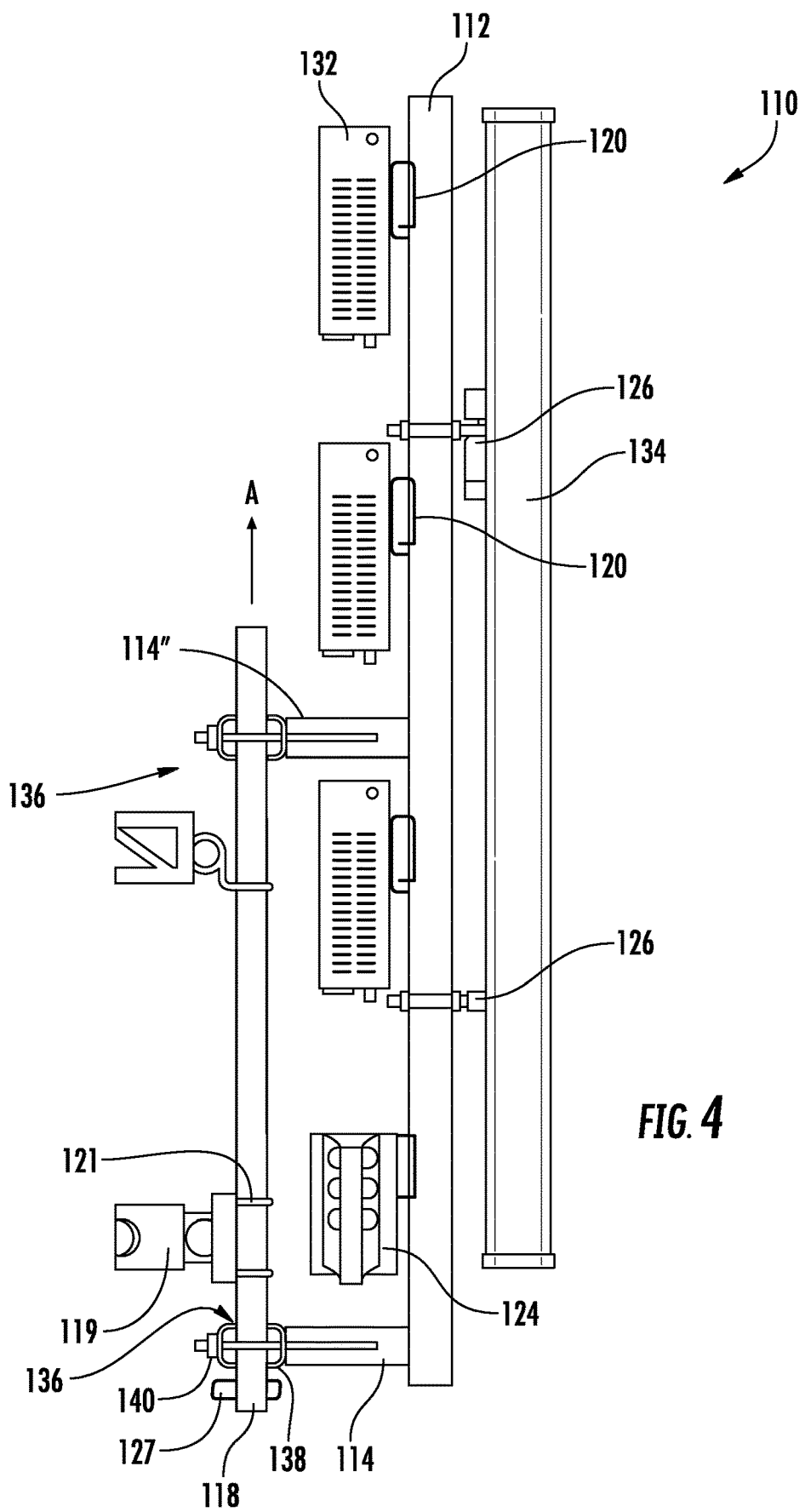
FIG. 4 is a side view of another pre-assembled cell site sector according to additional embodiments of the invention.

Referring now to the drawings, a cell site sector according to embodiments of the invention, designated broadly at 110, is shown in FIG. 2-4. The cell site sector 110 includes a single vertical mounting member 112 (typically formed of aluminum) on which an antenna 134 and three RRUs 132 are mounted. The vertical member 112 may have a cross-section that is round, square (which can provide increased wind load resistance) or another shape as desired. Two horizontal members 114 are fixed to the vertical mounting member 112 and extend rearwardly (i.e., away from the antenna 134). Each of the horizontal members 114 has a clamp 136 on its free end; each clamp 136 has two clamp brackets 138, 140 that may be clamped together via bolts 142. The clamps 136 are employed to mount the cell site sector 110 to a mounting structure such as an antenna tower or the like (see FIG. 4, which illustrates the clamps 136 mounted to a vertical adapter pipe 118 that is mounted to an antenna tower 119 via U-bolts 121). Note that the upper horizontal member is shown at 114 in FIG. 2, at 114' in FIG. 3, and at 114" in FIG. 4 to illustrate three different locations on the vertical member 112.

Two mounts 126 are fixed to the front surface of the vertical member 112 and provide mounting locations for the antenna 134 (see FIG. 4). Four horizontal mounts 120 are fixed to the rear surface of the vertical member 112 and provide mounting locations for the three RRUs 132 and for fiber/power distribution and RF signal combining units 122, 124 (FIGS. 2 and 4). Notably, the mounts 120 are configured so that each RRU 132 is oriented with its width dimension (i.e., the larger of its horizontal dimensions) generally parallel with the width dimension of the antenna 134, and its depth dimension (i.e., the smaller of its horizontal dimensions) generally perpendicular to the width dimension of the antenna 134. In this orientation, the cell site sector 110 may experience a reduced wind load compared to prior cell site sectors, as winds blowing parallel to the width direction face a reduced surface area from the RRUs 132, and winds perpendicular to the width direction are blocked from the RRUs 132 by the antenna 134 (or from the antenna 134 by the RRUs 132).

Referring again to FIG. 4, the vertical adapter pipe 118 used to mount the cell site sector 110 to the antenna tower 119 has a safety stop collar 127 at its lower end. The adapter pipe 118 serves as an axis of azimuth rotation A for the cell site sector 110. The safety stop collar 127 is configured to prevent the cell site sector 110 from slipping off of the lower end of the adapter pipe 118 when the clamps 136 are loosened to allow for azimuth adjustment of the antenna 134.

As shown in FIG. 3, the cell site sector 110 may have a lifting hoist flange 144 located at the upper end of the vertical member 112. The hoist flange 144 (or other hoisting device) may be positioned at or near the vertical center of gravity of the cell site sector 110 to reduce rocking, swaying, twisting or the like during hoisting of the cell site sector 110 during installation.

Figure 5:
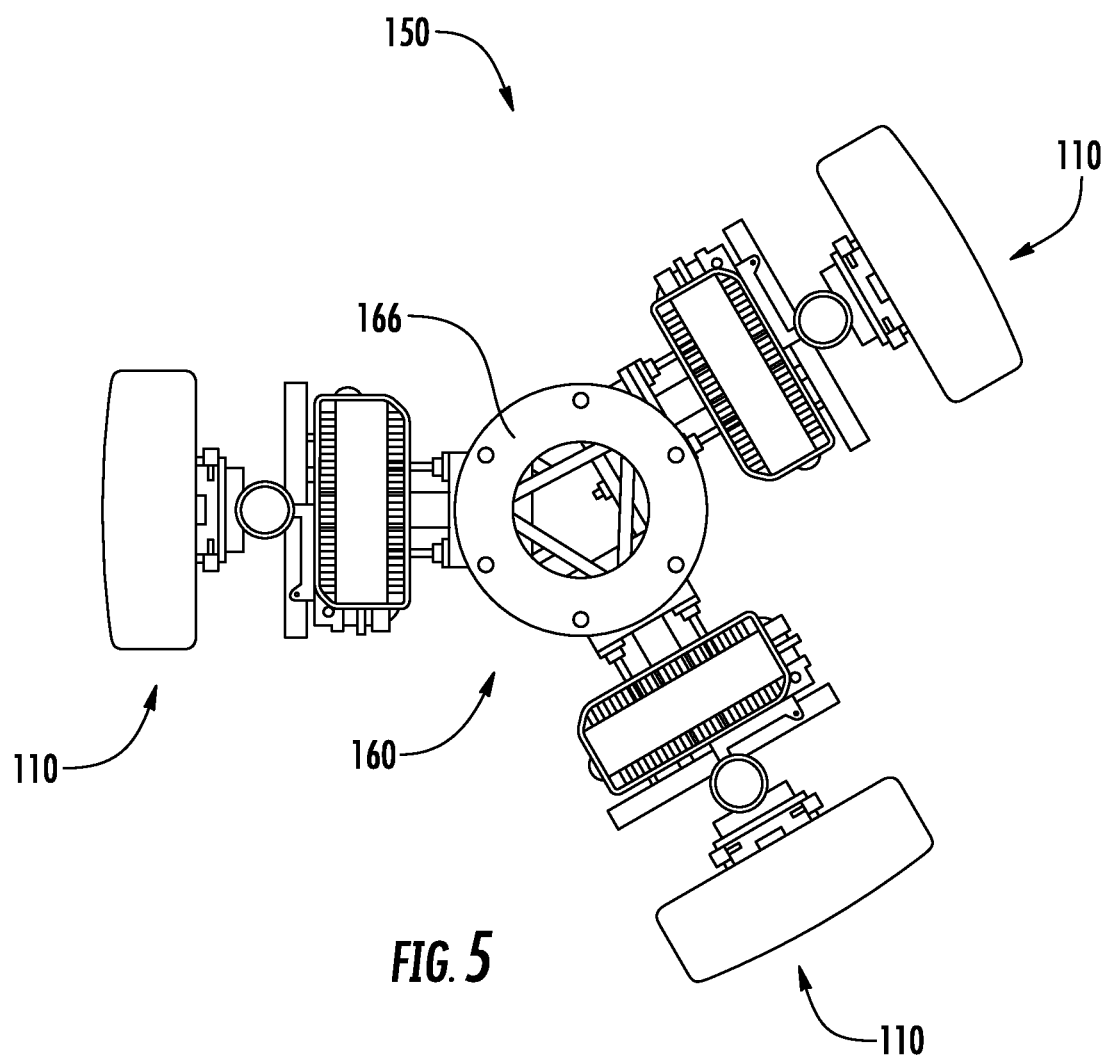
FIG. 5 is a top view of three cell site sectors of FIG. 4 mounted to a tri-sector frame.
Figure 6:
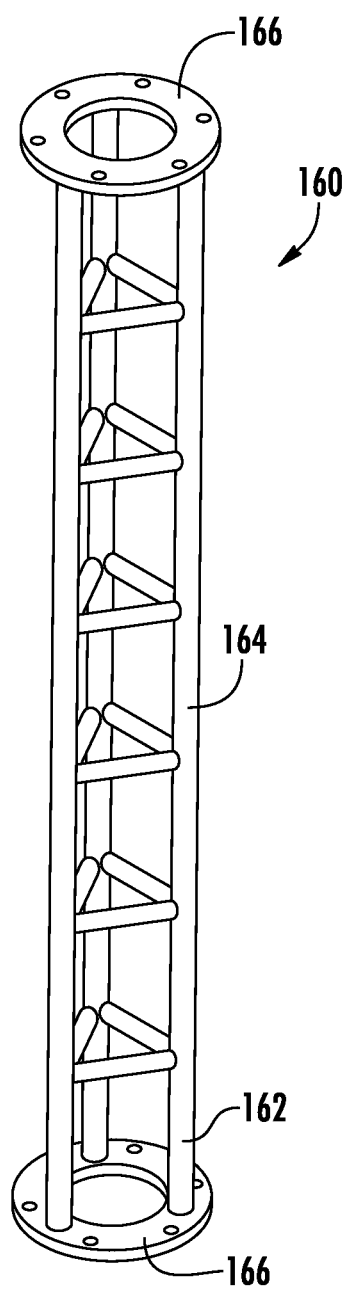
FIG. 6 is a perspective view of the frame of FIG. 5.
Figure 7:
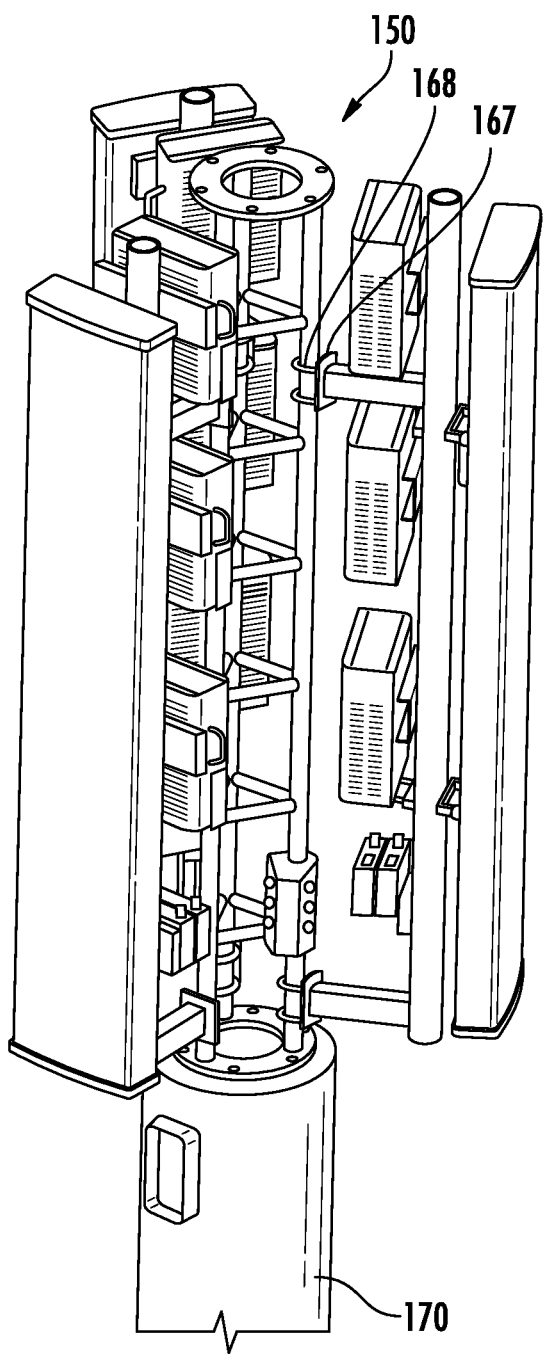
FIG. 7 is a perspective view of the cell site sectors and frame of FIG. 5.

Referring now to FIGS. 5-7, a tri-sector assembly 150 is shown therein. The assembly 150 includes three cell site sectors 110 largely as described above. The cell site sectors 110 are mounted to a frame 160 (best seen in FIG. 6) that includes three vertical members 162 spanned by numerous braces 164 that form a triangular pattern. End plates 166 are attached at the upper and lower ends of the vertical members 162. FIG. 5 shows that the cell site sectors 110 may be mounted to the vertical members 162 of the frame 160 via clamps 136 as shown in FIG. 4. Alternatively, as shown in FIG. 7, each of the three cell site sectors 110 may be mounted to a respective vertical member 162 via U-bolts 168 inserted into a plate 167 mounted on the ends of the horizontal members 114.

FIG. 7 illustrates the assembly 150 mounted atop a pole or tower 170. Notably, the tri-sector assembly 150 can be fully assembled on the ground, then hoisted in its entirety to the top of a structure for mounting. FIG. 8 illustrates two tri-sector assemblies 150 mounted in vertically stacked fashion on top of the pole/tower 170. Such an arrangement may be particularly advantageous if different cell site operators own and deploy each of the tri-sector assemblies 150.

FIG. 9 illustrates a tri-sector assembly 150' that is mounted on a monopole 180. The assembly 150' includes three cell site sectors 110 with vertical adapter poles 114. Each of the adapter poles 114 is mounted to a respective pair of six brackets 171 that are secured with horizontal bolts 172 to form two mounting rings 174. The mounting rings 174 are then secured onto the monopole 180 at a desired height. As with the assembly 150, the assembly 150' can be fully assembled on the ground and hoisted in its entirety for mounting on the monopole 180.

Figure 10:
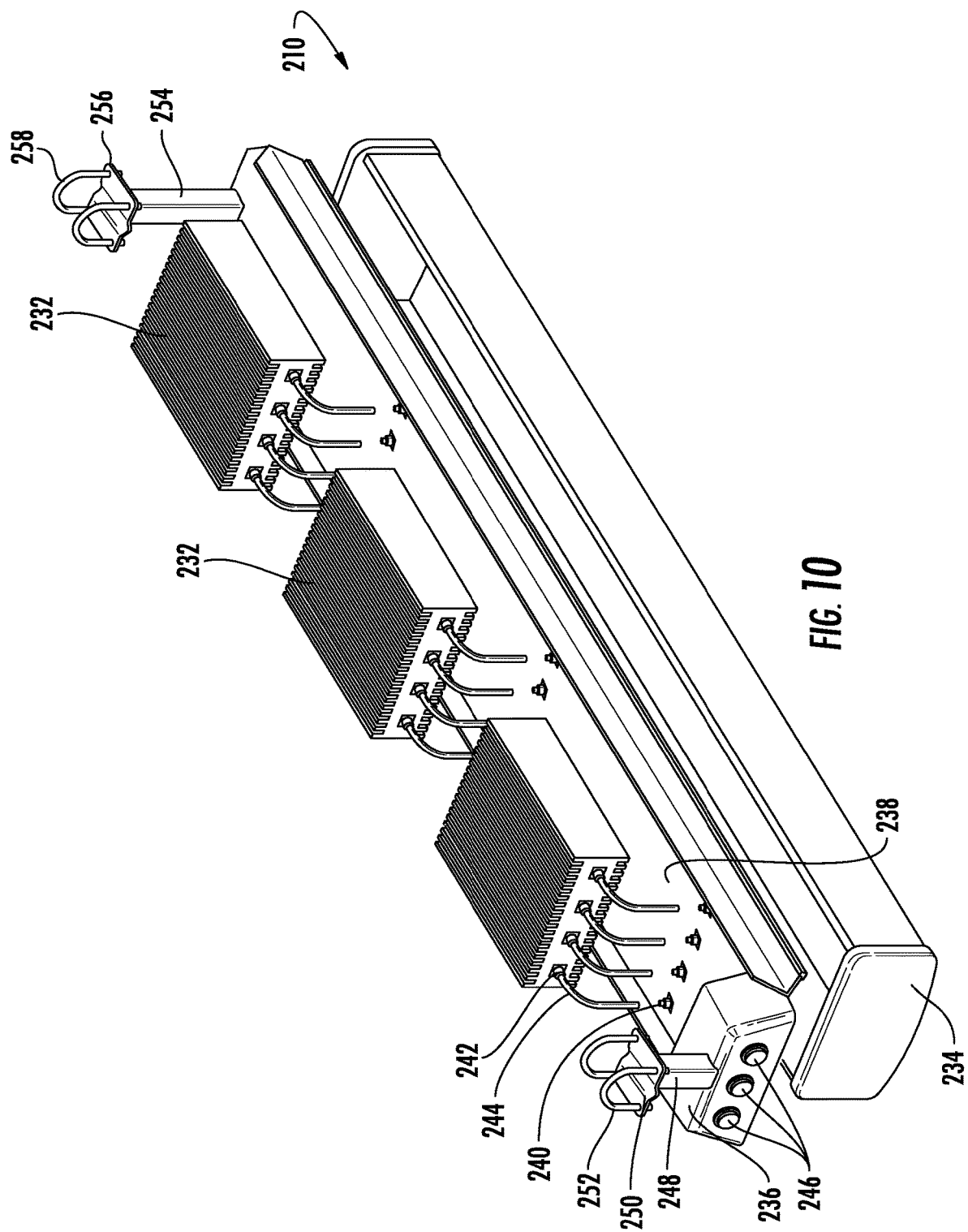
FIG. 10 is a perspective view of a backplane-based cell site sector according to additional embodiments of the invention.

Referring now to FIG. 10, another cell site sector, designated broadly at 210, is shown therein. The cell site sector 210 includes an antenna 234, three RRUs 232, and a fiber/power distribution unit 236. These are all mounted to a structural backplane 238, which replaces the vertical member, horizontal members, mounts, etc. of the cell site sector 110 as a mounting frame, with the RRUs 232 and fiber/power distribution unit 236 mounted on one side of the backplane 238, and the antenna 234 mounted on the opposite side. Mounting features for mounting the RRUs 232 and the antenna 234 onto the backplane 238 are integrated into the backplane 238.

The backplane 238 includes three sets of connectors 240. Each of the RRUs 232 is mounted to the backplane 238 adjacent the connectors 240, such that connectors 242 on each RRU 232 can be connected to the adjacent set of connectors 240 via jumper cords 244. The antenna 234 is connected to mating connectors (not shown) on the opposite side of the backplane 238 via jumper cables (also not shown). In this manner the RRUs 232 are connected to the antenna 234. The short length of jumper cords 244 can improve signal propagation, and the proximity of the connectors 242 of the RRUs 232 to the connectors 240 of the backplane 238 can reduce the risk of incorrect connections.

The fiber/power distribution unit 236 is mounted directly to the backplane 238. Three hybrid fiber/power connectors 246 are located on the lower end of the fiber/power distribution unit 236 to receive cables routed from the ground. In some embodiments, the connectors 246 may be separate power and fiber connectors to receive separate fiber and power cables routed from the bottom of the tower.

A horizontal mounting bar 248 extends from the fiber/power distribution unit 236 to a mounting panel 250 with U-bolts 252. A horizontal mounting bar 254 extends rearwardly from the opposite end of the backplane 238. A mounting panel 256 with U-bolts 258 is attached to the free end of the mounting bar 254. The cell site sector 210 can be mounted to an antenna tower or the like via the U-bolts 252, 258 in much the manner described above.

Figure 11:
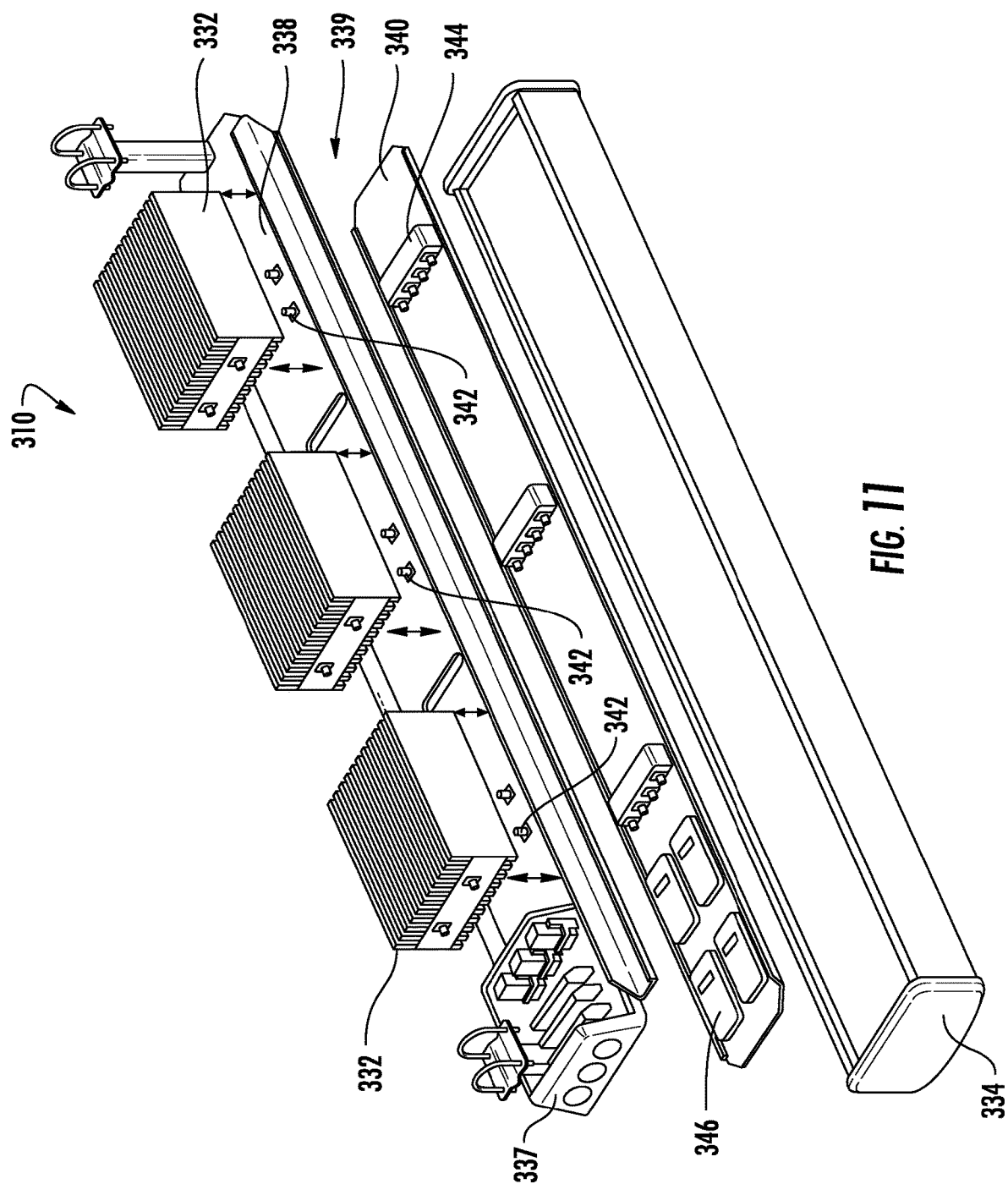
FIG. 11 is an exploded perspective view of a backplane-based cell site sector according to additional embodiments of the invention.

Referring now to FIGS. 11 and 12, another embodiment of a cell site sector, designated broadly at 310, is illustrated therein. The cell site sector 310 includes an antenna 334, three RRUs 332, a structural backplane 338 to which the RRUs 332 mount, and further includes a subfloor 340 that is sandwiched between the antenna 334 and the backplane 338. The subfloor 340 is spaced from and sealed to the backplane 338 to form a cavity 339. These components are described in greater detail below.

In addition to being structurally mounted to the backplane 338, each of the RRUs 332 is electrically connected directly to connectors 342 mounted in the backplane 338. Each RRU 332 includes connectors (for example, connectors that satisfy the "4.3/10" standard proposed by the International Electrical Commission (46F/243/NP)) that blind mate with the connectors 342 mounted on the backplane 338. Exemplary connectors include, for example, those described in U.S. patent application Ser. No. 14/594,727, filed Jan. 12, 2015, and U.S. patent application Ser. No. 15/141,526, filed Apr. 28, 2016, the disclosures of which are hereby incorporated herein by reference in their entirety. In some embodiments, the blind mating connection may occur with the RRUs 332 simply being slid into place along a direction normal to the backplane 338 (see the arrows in FIG. 11). An exemplary configuration is shown in U.S. Patent Publication No. 2016/0104969, filed Oct. 8, 2015, the disclosure of which is hereby incorporated herein in its entirety.

Antenna interface connections 344 are mounted to the subfloor 340 to enable interconnection with the antenna 334. The cavity 339 between the subfloor 340 and the backplane 338 allows room for cables to extend between the connectors 342 and the antenna interface connections 344. The subfloor 340 also serves as a potential mounting location for RF conditioning components 346, such as RF combiners, RF diplexers, RF filters, and the like.

A fiber/power distribution unit 337 is mounted on the backplane 338 (FIG. 12). The fiber/power distribution unit 337 includes connectors 339 on its lower surface to receive cables routed up the tower. In addition to the conventional fiber/power distribution components typically found in such a unit, the fiber/power distribution unit 337 may also include other components that can improve/facilitate performance of the cell site sector 310. Such components may provide voltage regulation, power redundancy, overvoltage protection, and the like. Any of all of these components may be configured to be replaceable in a "plug and play" manner. Exemplary components are discussed in U.S. Provisional Patent Application Nos. 62/280,549, filed Jan. 19, 2016, and 62/256,318, filed Nov. 17, 2015, the disclosures of which are hereby incorporated herein in their entirety.

Referring now to FIGS. 13 and 14, a backplane-based cell site sector 410 is illustrated therein that includes an optional cover panel 450 that overlies the backplane 438 and contacts the antenna 434. The cover panel 450 has ventilation perforations 452 at each end that allow air to flow through the cavity created beneath the cover panel 450 in a directed manner. In some embodiments, baffling 456 is included near and between the RRUs 432 to direct air flow within the cavity, providing some cooling for heat-sensitive components, such as the RRUs 432. The perforations 452 should be sized to provide adequate air flow, but prevent insect and/or animal intrusion.

FIGS. 13 and 14 also illustrate a cable cover 458 that compliments the cover panel 450 at the lower end of the cell site sector 410. The cable cover 458 provides shelter for cables 460 routed to the RRUs 432 from the fiber/power distribution unit 436, as well as any cables 462 routed from the RRUs 432 to the antenna 434.

Figure 15:
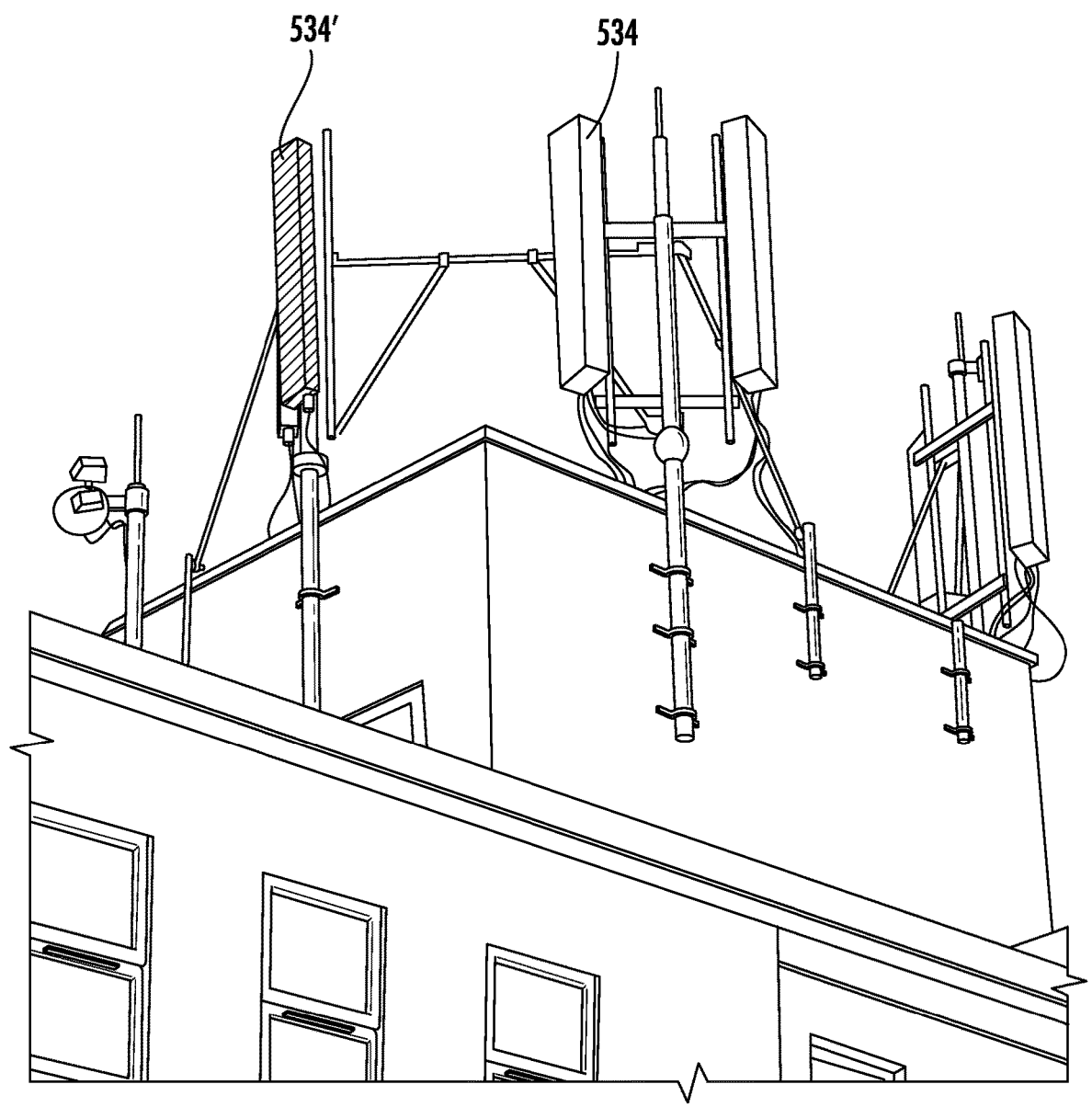
FIG. 15 is a perspective view of cell site sectors of FIG. 11 mounted on an upper story of a building, with reflective film on two of the cell site sectors to encourage "blending" with the environment.

FIG. 15 illustrates that a cover panel and/or an antenna itself may be covered with a reflective film that can "match" the cell site sector color to the sky or background. Such a covering (seen in antenna 534 in FIG. 15, but not in antenna 534') can provide some degree of camouflage to enable an antenna to blend in with its surroundings for aesthetic reasons.

Figure 16:
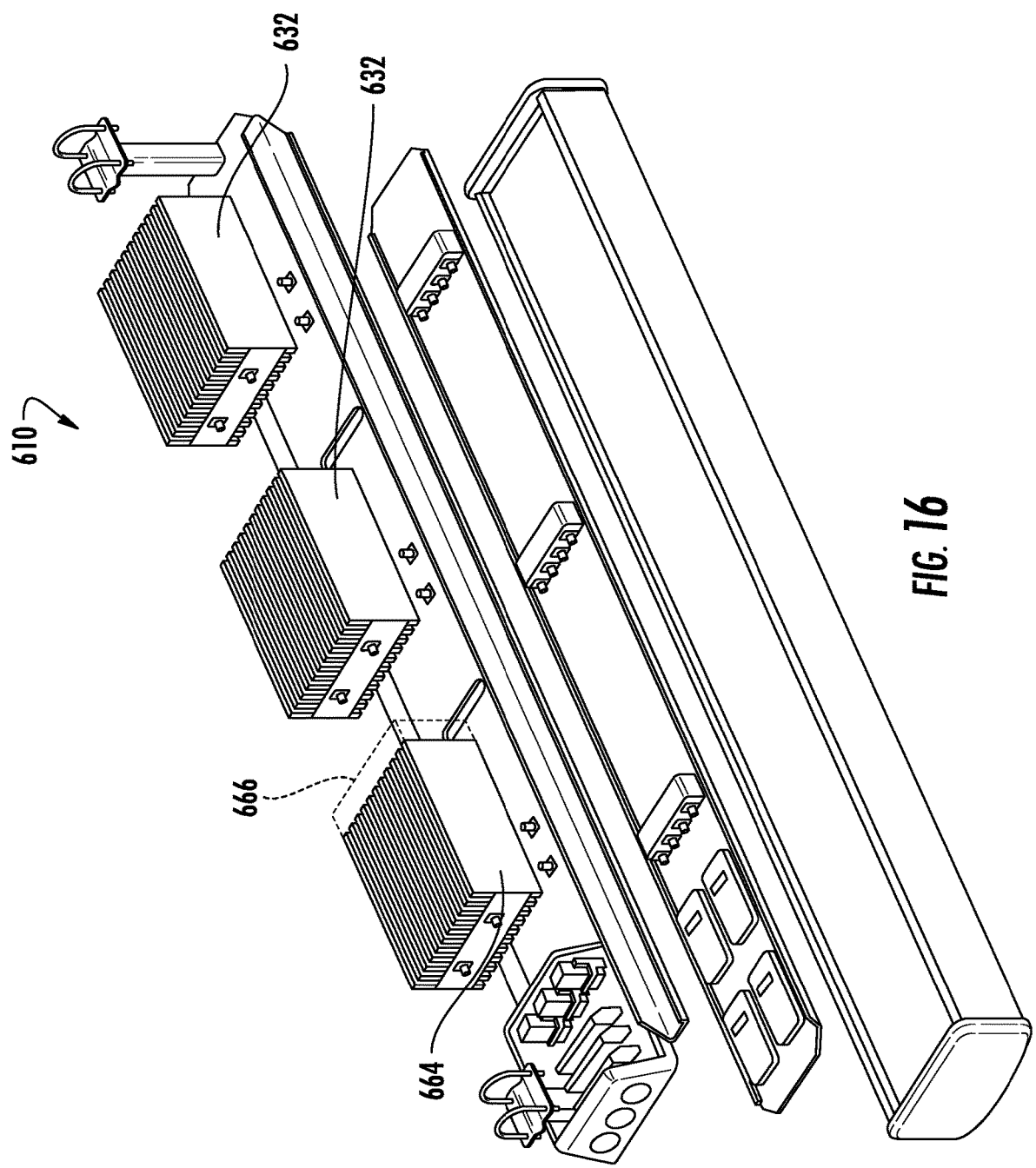
FIG. 16 is a perspective view of the cell site sector of FIG. 11 with an AC-DC converter module mounted thereon.

FIG. 16 illustrates an alternative cell site sector 610 that includes a battery module 664 mounted in a position occupied by an RRU in embodiments discussed above (the cell site sector 610 still includes two RRUs 632 in other positions). The presence of the battery module 664 can provide reserve capacity to power the RRUs 632 in the event of a grid power failure. Because the battery module 664 is located at the top of the antenna tower (rather than at the base of the tower as is typical), opportunities for theft are reduced considerably, and lower line losses are present due to a much shorter cable length from battery to RRU. FIG. 16 also illustrates an integrated AC-DC converter 666 attached to (or integrated with) the battery module 664 that accepts AC power at the top of the tower and delivers steady state or backup power to the RRUs 632. Locating the AC-DC converter 666 at the top of the tower provides AC power at the top of the tower (rather than at the bottom of the tower), thereby reducing energy losses.

Figure 17:
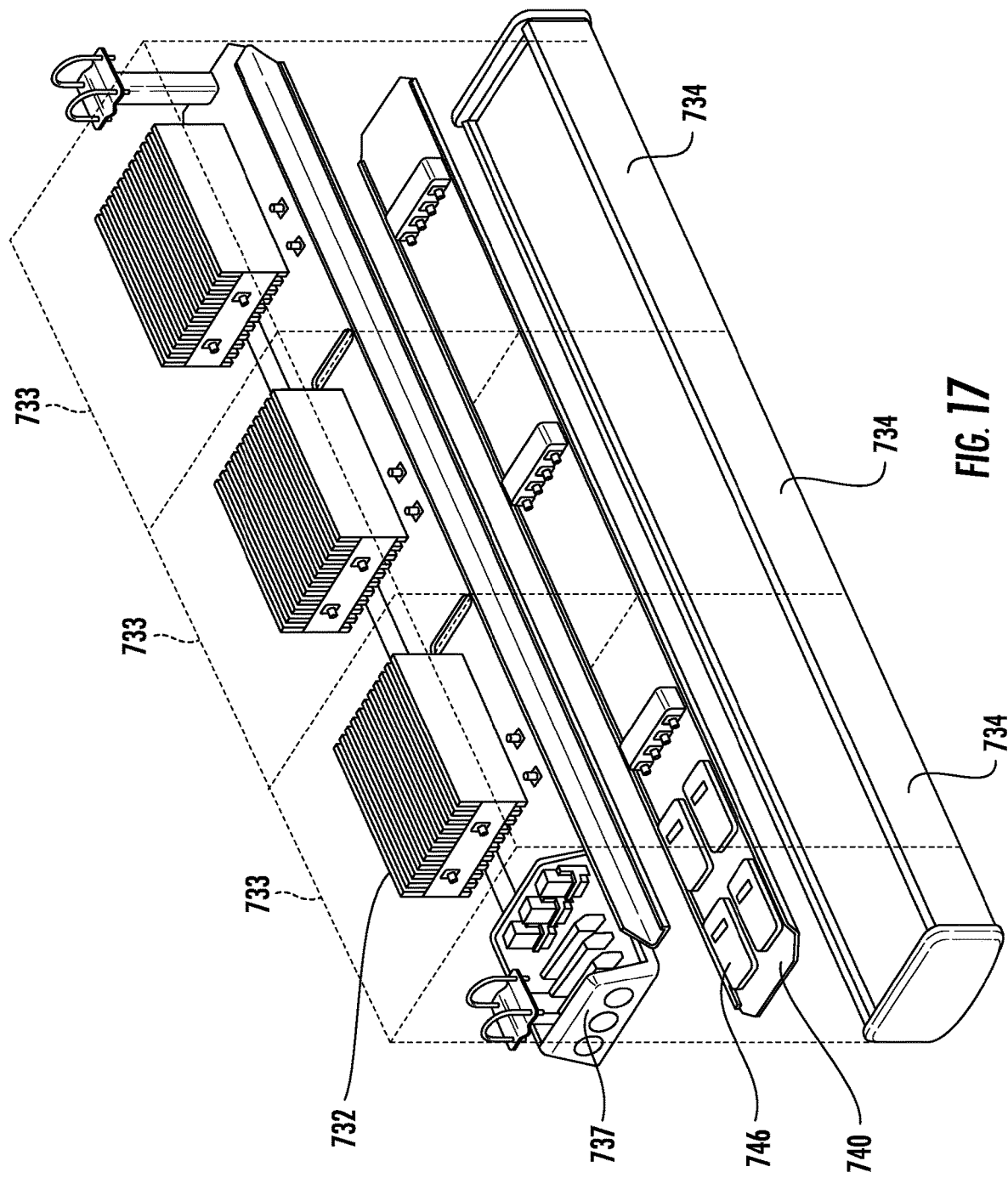
FIG. 17 is a perspective view of the cell site sector of FIG. 11 illustrating how the cell site sector could be provided in modular fashion.

FIG. 17 illustrates a modular cell site sector 710 that includes one RRU 732 and one antenna 734 per module 733. The lowermost module 733 includes the fiber/power distribution unit 737 (potentially with the components discussed above with respect to unit 337 discussed above) as well as the RF conditioning components 746 mounted on the subfloor 740. Subsequent modules 733 can be added later (likely in a stacked fashion as illustrated) and can utilize the fiber/power distribution unit 737 and the RF conditioning components 746 of the lowermost module 733.

Figure 18:
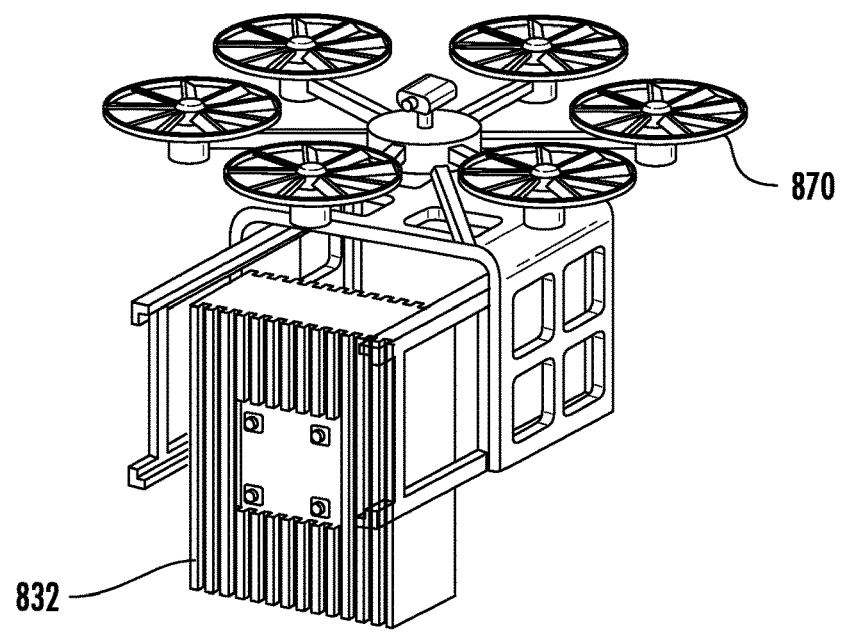
FIG. 18 is a perspective view of an RRU for a cell site sector of FIG. 11 being transported by a drone.
Figure 19:
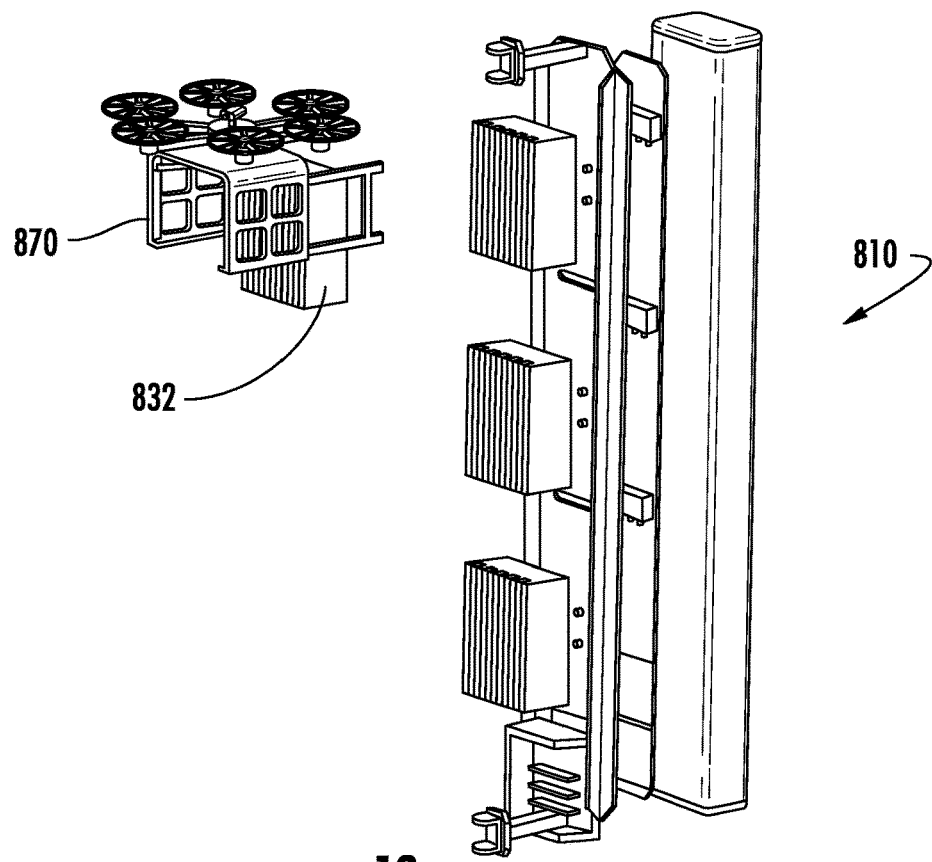
FIG. 19 is a perspective view of the drone and RRU of FIG. 18 hovering for remote installation of the RRU onto an existing cell site sector.

FIGS. 18 and 19 illustrate one of the potential advantages of the "plug and play" nature of the RRUs of the cell site sectors discussed in FIGS. 11-17. For the purposes of installing or replacing an RRU 832 in a cell site sector 810, a flighted drone 870 may be employed to both transport an old RRU 832 from the cell site sector 810 as it is mounted on the top of the tower and convey a new RRU 832 from the ground to the top of the tower and mount it thereon. Such operations may be much quicker and less expensive than requiring a technician to scale the tower to perform such a replacement operation.

It should also be noted that the cell site sectors discussed above may be combined with a system for adjusting the beam of the antennas mounted thereon, whether the systems are manually adjusted, automatically adjusted, or even adjusted in real time. Such systems are discussed, for example, in U.S. Provisional Patent Application No. 62/331,703, filed May 4, 2016, the disclosure of which is hereby incorporated herein by reference in its entirety.

The several embodiments of cell sector radio assemblies and their components described herein and/or shown in the drawings are presented by way of example only and are not limiting as to the scope of the invention. Unless otherwise specifically stated, individual aspects and components of the cell sector radio assemblies may be modified without departing from the scope and spirit of the invention.

That which is claimed is:

1. A cell site sector, comprising:
   an antenna tower;
   a mounting frame mounted to the antenna tower;
   a radio frequency (RF) antenna mounted to one side of the mounting frame;
   at least one remote radio unit (RRU) mounted to a second, opposed side of the mounting frame and operationally connected with the antenna; and
   a fiber/power distribution unit mounted to the second side of the mounting frame;
   wherein the RRU and the RF antenna have horizontal width and depth dimensions, the width dimension being greater than the depth dimension, and wherein the width dimension of the RRU is generally parallel with the width dimension of the RF antenna.

2. The cell site sector defined in claim 1, wherein the mounting frame comprises a vertical member to which the RF antenna and the RRU are mounted, and further comprises at least one horizontal member attached to the vertical member and extending away from the RF antenna.

3. The cell site sector defined in claim 2, wherein the mounting frame comprises a vertical adapter member mounted to the horizontal member opposite the vertical member, the vertical adapter member configured for mounting to a cellular mounting structure and positioned to define an azimuth adjustment pivot axis.

4. The cell site sector defined in claim 2, wherein the antenna tower comprises a monopole, and wherein the horizontal members are attached to brackets that are mounted on the monopole.

5. The cell site sector defined in claim 1, further comprising a fiber/power distribution unit mounted to the second side of the mounting frame.

6. A tri-sector assembly, comprising:
   three cell site sectors as defined in claim 1, and
   a tri-sector frame including three vertical mounting members, wherein each of the cell site sectors is mounted to a respective one of the vertical mounting members, and wherein the tri-sector frame is mounted to the antenna tower.

7. A cellular site, comprising at least two tri-sector assemblies as defined in claim 6 in stacked relationship.

8. The cell site sector defined in claim 1, wherein the mounting frame comprises a backplane.

9. The cell site sector defined in claim 8, wherein the backplane includes connectors configured to connect with the RRU.

10. The cell site sector defined in claim 9, wherein the connectors are connected with cables that are in turn connected with the RRU.

11. The cell site sector defined in claim 9, wherein the RRU includes connectors, and RRU connectors being blindmated to the backplane connectors.

12. The cell site sector defined in claim 8, further comprising a fiber/power distribution unit mounted to the second side of the backplane.

13. The cell site sector defined in claim 8, wherein the mounting frame further comprises a subfloor attached to the backplane, and wherein the antenna is mounted to the subfloor and the RRU is mounted to the backplane.

14. The cell site sector defined in claim 13, further comprising RF conditioning components mounted to the subfloor.

15. The cell site sector defined in claim 13, wherein the fiber/power distribution unit is mounted to the backplane.

16. The cell site sector defined in claim 15, wherein the fiber/power distribution unit includes at least one of: a voltage regulator; a power redundancy circuit; and an overvoltage protection unit.

17. The cell site sector defined in claim 13, further comprising a cover panel that overlies the backplane and the RRU, the cover panel including perforations for permitting air flow between the cover panel and the backplane.

18. The cell site sector defined in claim 17, further comprising one or more baffles mounted between the cover panel and the backplane for selectively directing air flow.

19. The cell site sector defined in claim 13, further comprising a battery module mounted to the backplane.

20. The cell site sector defined in claim 19, further comprising an AC-DC convertor module mounted to the backplane adjacent the battery module.

* * * * *